United States Patent
Delisle et al.

(10) Patent No.: US 11,220,235 B2
(45) Date of Patent: Jan. 11, 2022

(54) SYSTEMS AND METHODS FOR INFLATOR-BASED ACTUATION

(71) Applicant: Systems Engineering Associates Corporation, Middletown, RI (US)

(72) Inventors: Andrew Delisle, Tiverton, RI (US); Richard Gagnon, Somerset, MA (US); Barry Holland, Jamestown, RI (US); Keith Amaral, Fairhaven, MA (US)

(73) Assignee: Systems Engineering Associates Corporation, Middletown, RI (US)

( * ) Notice: Subject to any disclaimer, the term of this patent is extended or adjusted under 35 U.S.C. 154(b) by 11 days.

(21) Appl. No.: 16/063,489

(22) PCT Filed: Dec. 19, 2016

(86) PCT No.: PCT/IB2016/057800
§ 371 (c)(1),
(2) Date: Jun. 18, 2018

(87) PCT Pub. No.: WO2017/103912
PCT Pub. Date: Jun. 22, 2017

(65) Prior Publication Data
US 2020/0290553 A1 Sep. 17, 2020

Related U.S. Application Data

(60) Provisional application No. 62/269,041, filed on Dec. 17, 2015.

(51) Int. Cl.
*B60R 21/264* (2006.01)
*B23D 15/14* (2006.01)
(Continued)

(52) U.S. Cl.
CPC .......... *B60R 21/264* (2013.01); *B23D 15/145* (2013.01); *B60R 21/268* (2013.01);
(Continued)

(58) Field of Classification Search
CPC ..... B60R 12/26; B60R 21/264; B60R 21/268; B60R 2021/26094; F42B 3/04; F42B 3/006; F15B 15/19; F16K 13/06
See application file for complete search history.

(56) References Cited

U.S. PATENT DOCUMENTS 5,480,618 A * 1/1996 Caisson .............. B60R 21/2644
280/734
5,582,425 A * 12/1996 Skanberg .............. B60R 21/268
280/736

(Continued)

FOREIGN PATENT DOCUMENTS

JP 2007051740 A * 3/2007

*Primary Examiner* — Paul N Dickson
*Assistant Examiner* — Caitlin Anne Miller
(74) *Attorney, Agent, or Firm* — Barlow, Josephs & Holmes, Ltd.; Stephen J. Holmes

(57) ABSTRACT

An inflator-based system provides for the actuation of valves and other devices using automotive air bag inflators, for example. One or more inflators can be connected to a valve body with an adapter such that upon inflator activation, inflator gases can act on a piston or similar device to achieve desired movement or operation of the valve or device. An inflator-based actuator can provide for a single action or multiple actions of a valve or other device. Such a system can provide safer and more reliable alternatives to electro-explosive ordnance devices found in pyrovalves, for example. Other uses for an inflator-based actuation system can include a lanyard pull initiator, a dual cartridge cutter, a bolt cutter, a hot gas generator (HGG) body, and a HGG pressure cartridge, to name a few examples.

11 Claims, 7 Drawing Sheets

(51) Int. Cl.
    *B60R 21/274*     (2011.01)
    *F16K 31/122*     (2006.01)
    *F42B 3/00*     (2006.01)
    *F42B 3/04*     (2006.01)
    *B60R 21/268*     (2011.01)
    *B60R 21/26*     (2011.01)

(52) U.S. Cl.
    CPC .......... *B60R 21/274* (2013.01); *F16K 31/122* (2013.01); *F42B 3/006* (2013.01); *F42B 3/04* (2013.01); *B60R 2021/2642* (2013.01); *B60R 2021/26094* (2013.01)

(56) References Cited

U.S. PATENT DOCUMENTS

| | | | | |
|---|---|---|---|---|
| 5,820,162 A * | 10/1998 | Fink | ...................... | B60R 21/205 |
| | | | | 280/742 |
| 6,022,045 A * | 2/2000 | Faigle | ...................... | B60R 21/26 |
| | | | | 280/736 |
| 7,784,827 B2 * | 8/2010 | Smith | ................... | B60R 21/268 |
| | | | | 280/737 |
| 8,656,716 B2 * | 2/2014 | Schafer | ................... | B60R 21/38 |
| | | | | 60/632 |
| 9,352,722 B2 * | 5/2016 | Wasserman | ........... | B60R 21/274 |
| 9,975,511 B2 * | 5/2018 | Karner | ................. | H01H 47/325 |
| 2006/0267320 A1 * | 11/2006 | Lube | ..................... | B60R 21/239 |
| | | | | 280/735 |

\* cited by examiner

SYSTEMS AND METHODS FOR INFLATOR-BASED ACTUATION

CROSS-REFERENCE TO RELATED APPLICATIONS

This application is a Section 371 National Stage filing of PCT Application No. PCT/IB2016/057800, filed Jun. 18, 2018. This application also claims priority from U.S. Provisional Patent Application Ser. No. 62/269,041, filed Dec. 17, 2015, the disclosure of which is hereby incorporated by reference in its entirety.

STATEMENT REGARDING FEDERALLY SPONSORED RESEARCH OR DEVELOPMENT

This invention was made with government support under Contract No. HQ0147-13-C-7516 awarded by the Missile Defense Agency and Contract No. N65538-08-M-0013 awarded by the Naval Surface Warfare Center Carderock Division. The government has certain rights in the invention.

BACKGROUND

Field

The disclosed subject matter is generally directed to actuation systems, and more particularly, to systems and methods that provide for the actuation of valves and other devices using inflators, e.g., automotive airbag inflators.

Description of Related Art

Known actuation systems can be used to accomplish a variety of tasks. For example, known autonomous flow control can be accomplished through the use of Smart Valves. These valves have the ability to sense changes in fluid pressure, and through the use of external power and motor controllers, open or close themselves as the situation warrants. Due to the size and construction of these valves, the associated motor controllers need to be powerful enough to provide enough energy to operate the valve. As a result, these valve assembly configurations are typically very large, heavy and cumbersome and their dependency on external power to provide autonomous control is a survivability concern during a power casualty. Should power to these valves be lost, the valves will fail in their current state (e.g., open or closed).

Another type of actuation system uses a known pyrotechnic valve, referred to herein as a pyrovalve, or, more generally, an electro-explosive device (EED). An example of a pyrovalve is a one-time use propulsion component, often used to control propellant or pressurant systems on spacecraft. The device is activated by an electric signal to fire a small explosive charge which in turn shears away a small flange that initially blocked the flow path of the attached tubing. Another version of a pyrotechnic valve remains in an open position until activated. The pressure from the pyrotechnic charge then forces the flange into a weakened part of the attached tube to block the flow path of the tubing. These two versions of pyrotechnic valves are often referred to as normally-closed (NC) or normally-open (NO) valves, depending on their initial state before initiation of the pyrotechnic charge. FIG. 1 shows an example of a known normally-closed pyrovalve.

SUMMARY

The disclosed subject matter provides a system capable of inflator-based actuation of valves and other devices. Embodiments can be used to replace EED components in devices such as pyrovalves. Similar exemplary uses for an inflator-based actuation system can include a lanyard pull initiator, a dual cartridge cutter, a bolt cutter, a hot gas generator (HGG) body, and a HGG pressure cartridge, to name a few non-limiting examples.

An inflator-based system can provide for the actuation of valves and other devices using automotive air bag inflators, for example. One or more inflators can be connected to a valve body with an adapter or manifold such that upon inflator activation, inflator gases can act on a piston or similar device to achieve desired movement or operation of the valve or device. An inflator-based actuator can provide for a single action or multiple actions of a valve or other device. Such a system can provide safer and more reliable alternatives to EEDs found in pyrovalves, for example.

In an embodiment, an actuation system can include a valve body unit comprising a valve body, an inlet, an outlet, a piston, a valve shuttle a retaining cap, one or more gas generator adapters, and one or more gas generators operatively connected to the valve body via the one or more gas generator adapters.

An embodiment can include a controller for activating the gas generators in response to an activation signal, wherein, upon activation, gas from the one or more gas generators acts on the piston to achieve desired movement or operation of the actuation system, wherein the one or more gas generators are automotive airbag inflators. Embodiments can further include a directional control valve operatively connected to the one or more gas generator adapters and a power supply. In some embodiments, the controller is configured to activate a plurality of gas generators sequentially and with a predetermined time delay.

Various embodiments can include a pyrovalve, comprising a valve body unit comprising an inlet section, an outlet section disposed in spaced-apart relation such that a conveying path between the inlet and outlet section is established, an opening disposed between the inlet and outlet sections, a piston disposed inside a bore of the valve body unit, a valve shuttle operatively connected to the piston, a retaining cap, one or more gas generator adapters, and one or more gas generators operatively connected to the valve body via the one or more gas generator adapters. An embodiment can further include a controller for activating the gas generators in response to an activation signal, wherein, upon activation, gas from the one or more gas generators acts on the piston to achieve desired movement or operation of the valve shuttle. One or more gas generators can be automotive airbag inflators. Various embodiments can include a power supply. A controller can be configured to activate a plurality of gas generators sequentially and with a predetermined time delay.

BRIEF DESCRIPTION OF THE DRAWINGS

As will be realized, different embodiments are possible, and the details disclosed herein are capable of modification in various respects, all without departing from the scope of the claims. Accordingly, the drawings and descriptions are to be regarded as illustrative in nature and not as restrictive. Like reference numerals or characters are used throughout the several views and embodiments to designate like components.

DETAILED DESCRIPTION

Figure 1:
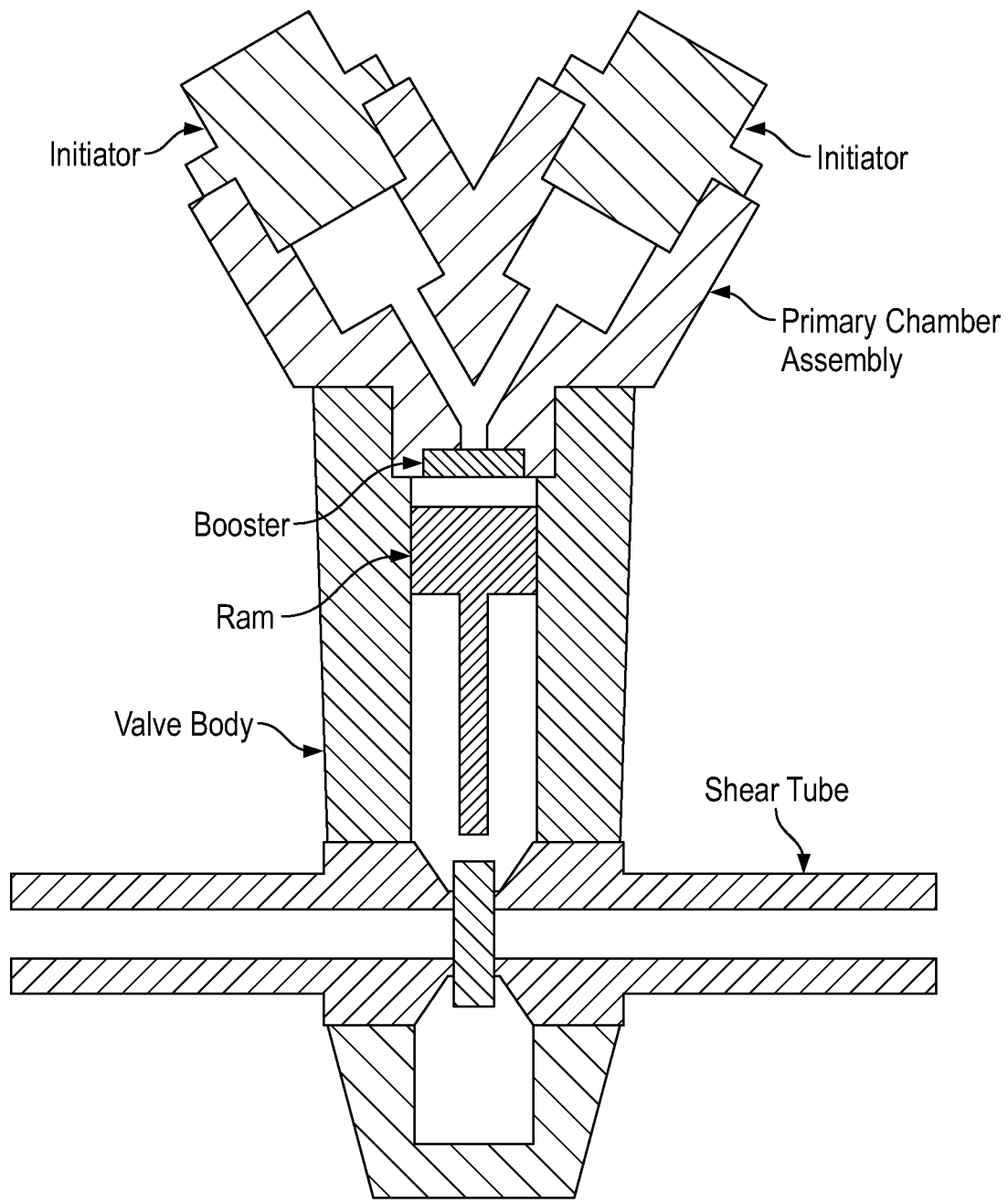
FIG. 1 shows an example of a known normally-closed pyrovalve.

To facilitate an understanding of the principles upon which the subject matter disclosed herein is based, several illustrative embodiments are described hereinafter with reference to their implementation as an emergency valve control actuator or to replace the EED components in devices such as pyrovalves. It will be appreciated that the practical applications of these principles are not limited to these particular types of implementations. Rather, they can be equally employed in any other type of operating environment where it is desired to provide for the rapid and reliable actuation of valves and other devices.

The disclosed exemplary embodiments innovate upon the principles disclosed in commonly owned U.S. Pat. No. 6,418,870, the disclosure of which is hereby incorporated by reference in its entirety. As used herein, the term "inflator" can be defined as including any replaceable, self-contained, sealed device that provides non-toxic, non-flammable, non-corrosive gases under pressure in a controlled manner, either as a by-product of a chemical reaction or through release of a stored inert compressed gas, or both, in response to an electrical signal. Exemplary inflators can include standard, commercial, off-the-shelf automotive air bag inflators, including those of the cold gas variety. Suitable inflators can also include hybrid gas inflators wherein a combination of compressed cold gas and some amount of energetic gas propellant can be employed. Propellant gas generators may also be used.

Exemplary automotive airbag inflators can be thought of as essentially very small containers of highly pressurized inert gases that are released when a small initiator is activated. The internal shock wave from the initiator breaks a burst disc inside the inflator, releasing the inert gases. Activation of the initiator requires a very small amount of electrical current that can either be supplied from normal power systems, if available, or from a small battery or capacitor backup system, for example. Because of the very small size and low cost of the inflators and electrical backup system, the exemplary embodiments can be packaged in a small volume and can operate independent of other systems in an emergency.

In an embodiment, an inflator can be a small, high pressure, high reliability flask that contains a quantity of one or more inert gases, such as argon and/or helium, under pressure. In an embodiment, on ignition, a small initiator can break a seal, releasing cold gas, or a small initiator can ignite solid propellant that can burn and generate a gas that mixes with the inert gases in the vessel to heat it. A seal of the pressure vessel containing the inert gases can be burned, burst, or ruptured using a piston or a shock wave. The gas from the propellant can be mixed with the inert gases and can escape through a thrust-neutralized port.

Several known vendors, including ARC Automotive, Autoliv, and Key Safety Systems, produce known examples of suitable inflators. In various exemplary embodiments, a single size inflator, the Autoliv ACH 2.2 180 kPa model, can be used to suitably actuate a range of valve sizes typically used in Smart Valve systems, for example.

Examples of known inflators are described in the following patents, the contents of which are expressly incorporated herein by reference: U.S. Pat. Nos. 7,883,108; 6,170,868; 5,979,936; 3,723,205; 3,756,621; 3,895,821; 5,033,772; 5,076,607; 5,345,876; 5,777,699; 5,899,411; 5,601,310; 5,747,730; 5,763,821; 5,850,053; 5,861,571; and 5,997,666. Such automotive cold gas generators can be desirable because they can be built to standards that are set by the automotive industry and that can exceed military standards for reliability. Such inflators can meet military-like specifications for longevity, impact resistance and insensitivity as munitions. The combustion product gas mix is typically benign. The firing readiness of such inflators typically does not degrade over time. Shelf life of these inflators can be approximately fifteen to twenty years with no maintenance or inspection required.

Commercially available automotive airbag canisters can be adapted to provide the impulse power to enable actuation. Airbag systems can be simple and nearly 100% reliable and meet Department of Transportation standards similar to compressed gas cylinders. Commercially available inflators, with a long shelf life, are relatively inexpensive, reliable and permit the modularity of a completely sealed, maintenance-free valve actuation system.

Figure 2:
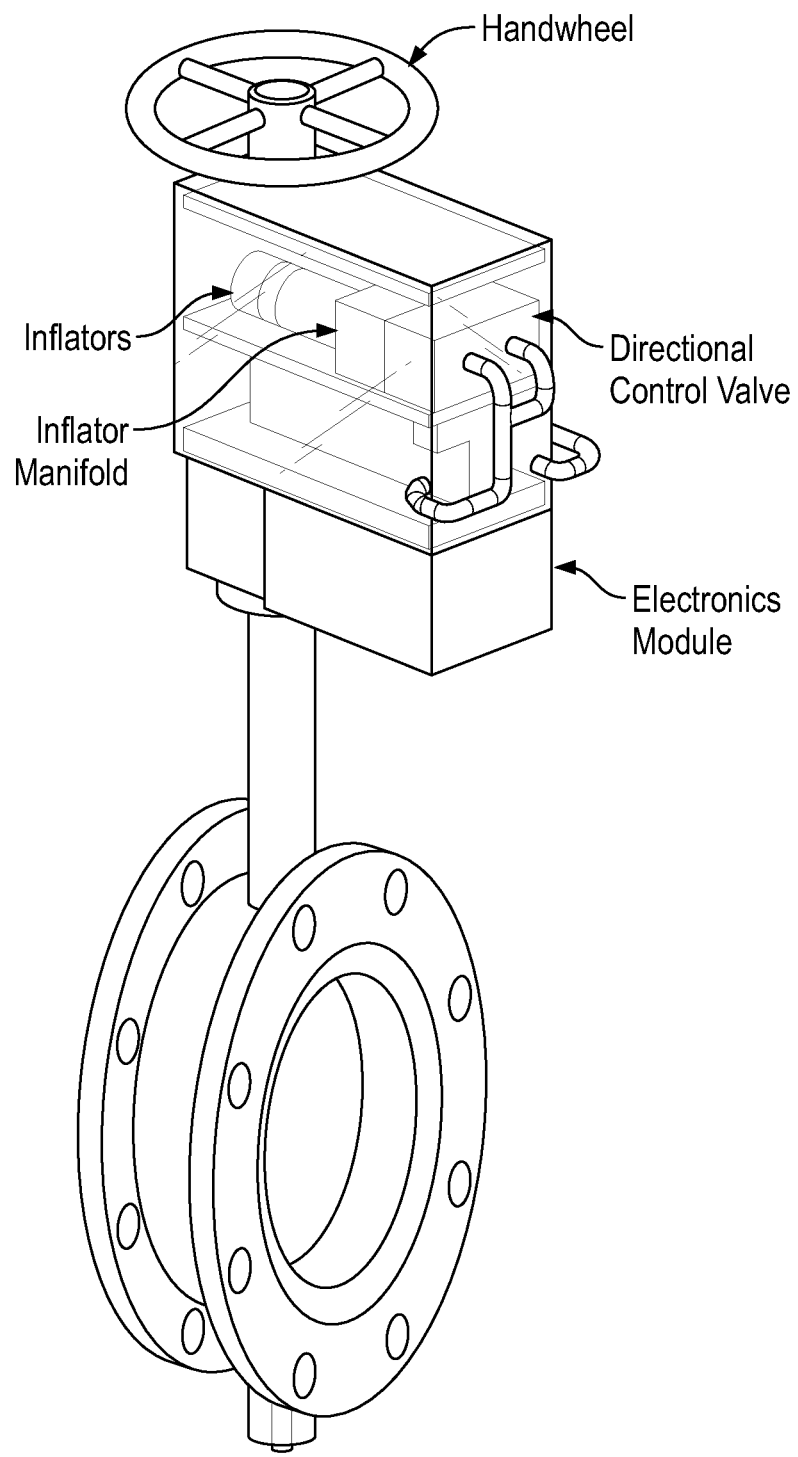
FIG. 2 shows a perspective view of an exemplary embodiment of an inflator-based emergency valve actuation system (IBEVAS).

Referring to the exemplary embodiment of an IBEVAS shown in FIG. 2, automotive airbag inflators can provide the energy source to open and shut valves in an emergency, for example, a piping rupture. In an embodiment, the inflators can store sufficient potential energy to open 8" or larger valves, for example, and can be activated from a small self-contained battery. In an example of the IBEVAS embodiment, one or more inflators can be connected via an inflator manifold to a directional control valve as part of a valve actuator. A handwheel can be provided to allow manual valve operation. An electronics enclosure can include a battery and control circuitry to control inflator initiation and valve direction. For normal operations, the system could be controlled and monitored with normally available electric power, but could shift to a small, e.g., D-cell battery, backup that could operate the system for extended time, e.g., more than a day. In an embodiment, the control circuitry could take up no more than 1 cu. in. of space for each valve. In remote locations, exemplary valve control circuitry could function off of a battery pack for years. With known battery technology, these battery packs could also be exceptionally small and contained within the circuitry enclosure on the valve.

Valve actuators can be integrated with autonomous ("Smart Valve") sensing technology. The inflator-based pneumatic valve actuator system can be used to provide energy to operate fluid system valves, especially in emergency situations where normal power sources might be lost. In piping systems, such as those found onboard ships, oil pipelines, chemical plants, nuclear power plants, etc., sensors can detect an unusual or emergency situation and send a signal to the inflator-based valve actuation system to automatically and remotely operate valves. Such remote actuation could be triggered by acoustic or RF signals, for example. The inflator-based system can help minimize the size of a valve assembly and can reduce or eliminate dependency on external power sources.

In an embodiment, one or more airbag inflators, for example, can be threaded into an inflator adapter, e.g., a manifold, to hold inflators in a sturdy manner to allow inflators to be discharged into a valve body or directional control valve. The inflators can be sealed with an O-ring or similar sealing device.

When multiple inflators are to be used, at an appropriate and predetermined time, for example, when the pressure has peaked and is beginning to decrease, the next inflator in the sequence can be initiated. This sequence may continue until all the inflators are discharged. This innovative process can minimize the forces on the internal components, thus minimizing unwanted damage. Any appropriate number of inflators could be provided depending on the nature of the job to be accomplished.

Figure 3A:
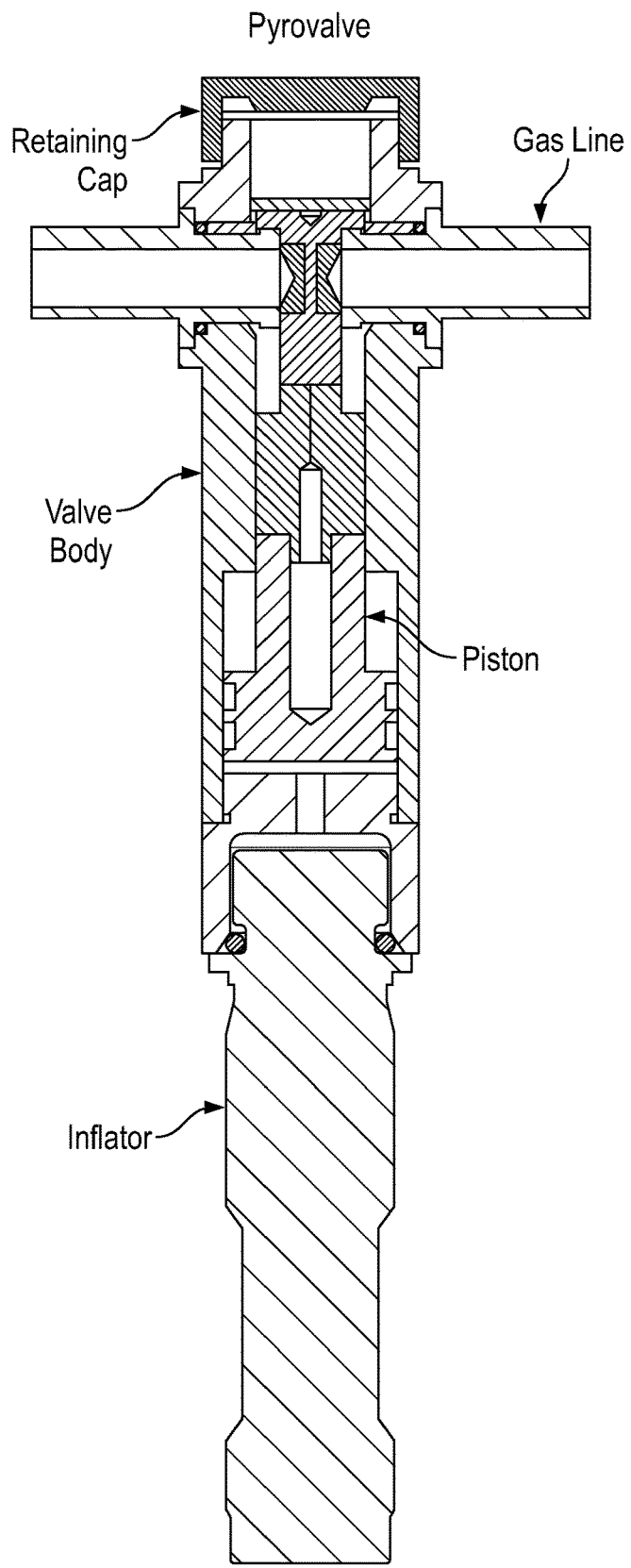
FIGS. 3A and 3B show exemplary embodiments of inflator-based actuators that can replace known pyrovalves.
Figure 3B:
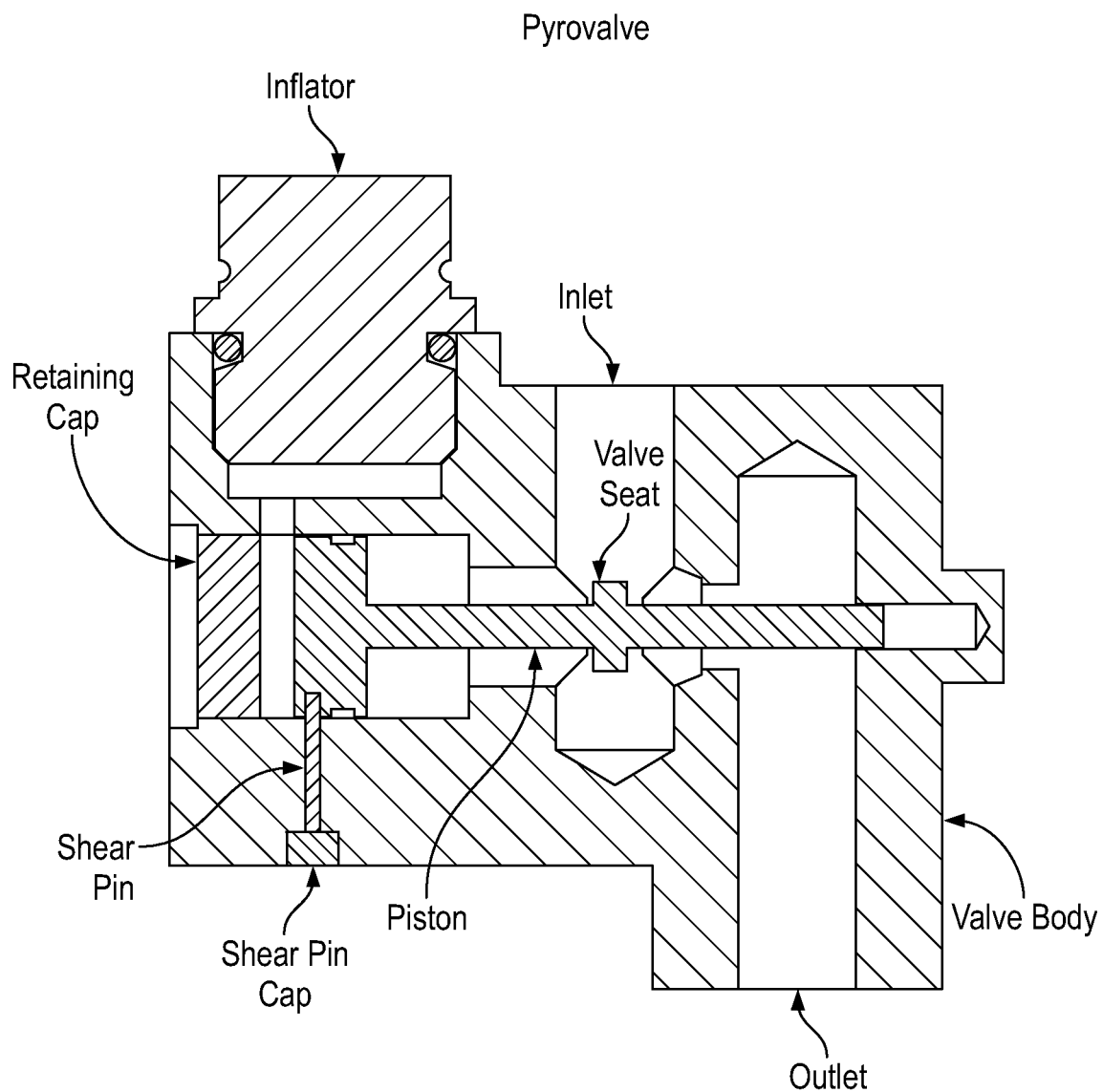

FIGS. 3A and 3B show exemplary embodiments of pyrovalves where operation can be controlled using an inflator-based valve actuation system. Such a device can be used, for example, in a normally-closed valve that is part of a missile system, where the NC valve holds 16K psi of gas on one side, for example. Rather than using an EED or cartridge-actuated device (CAD), an inflator-based actuation system can be used to switch the NC valve to an open position, allowing the gas to pass on a high pressure gas line. Components can include one or more inflators, a valve body, an inflator adapter or similar structure for allowing an inflator to suitably connect, e.g., threadably engage, with the valve body, a piston on which inflator gases act, a stub cap, a valve shuttle, a retaining cap, a shear pin, a shear pin cap, an inlet and an outlet.

Regarding differences between an inflator-based pyrovalve and IBEVAS, one difference can be that IBEVAS allows putting a mechanism on top of an existing valve to automatically have it open/close/open or close/open/close (three actions). The operation of an inflator-based pyrovalve can be a single one-time opening of a normally closed valve or a single one-time closing of a normally open valve.

Figure 4:
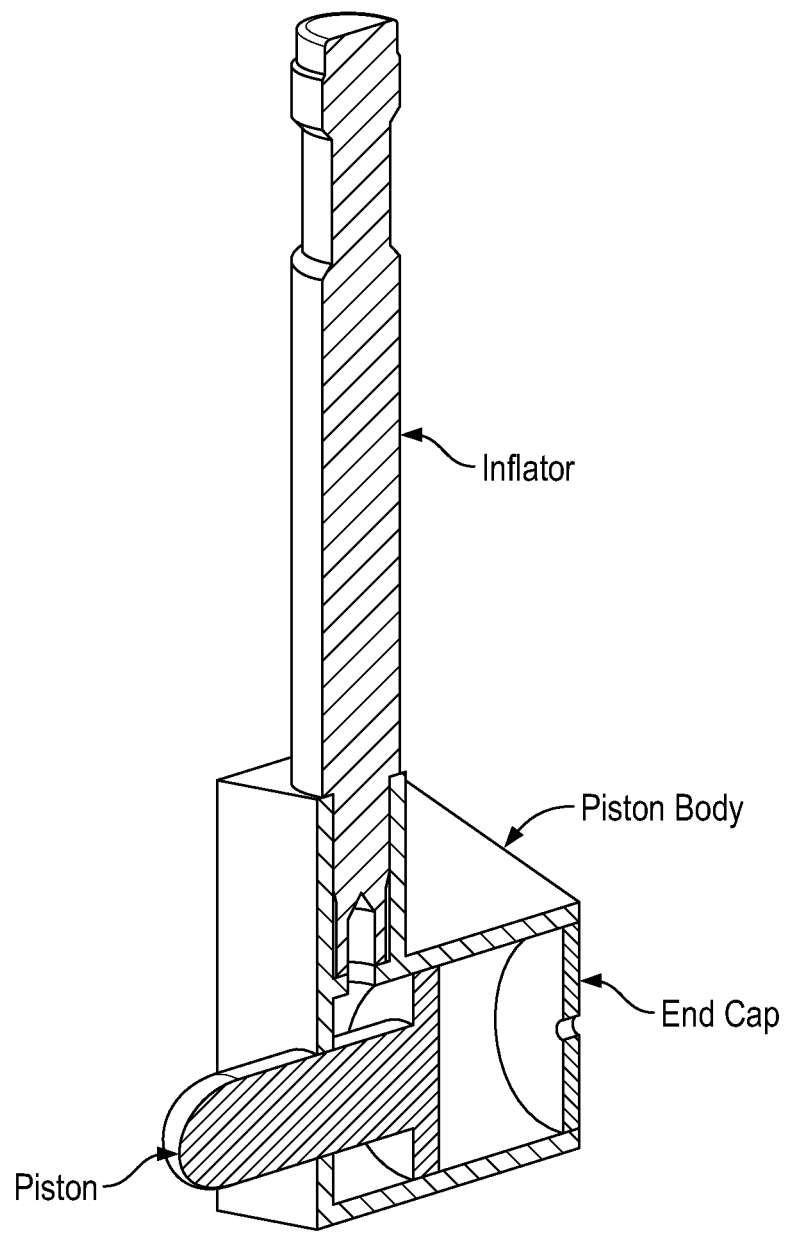
FIG. 4 shows a perspective view of a lanyard pull initiator embodiment.

FIG. 4 shows an exemplary embodiment of a lanyard puller or lanyard pull initiator. An example of a lanyard puller is an energetics-based device that can be actuated by a separation event, such as a launch vehicle stage separation. An inflator can be attached to a piston body, where upon inflator initiation, inflator gases can act upon a piston to achieve desired movement and operation of the puller mechanism.

Figure 5:
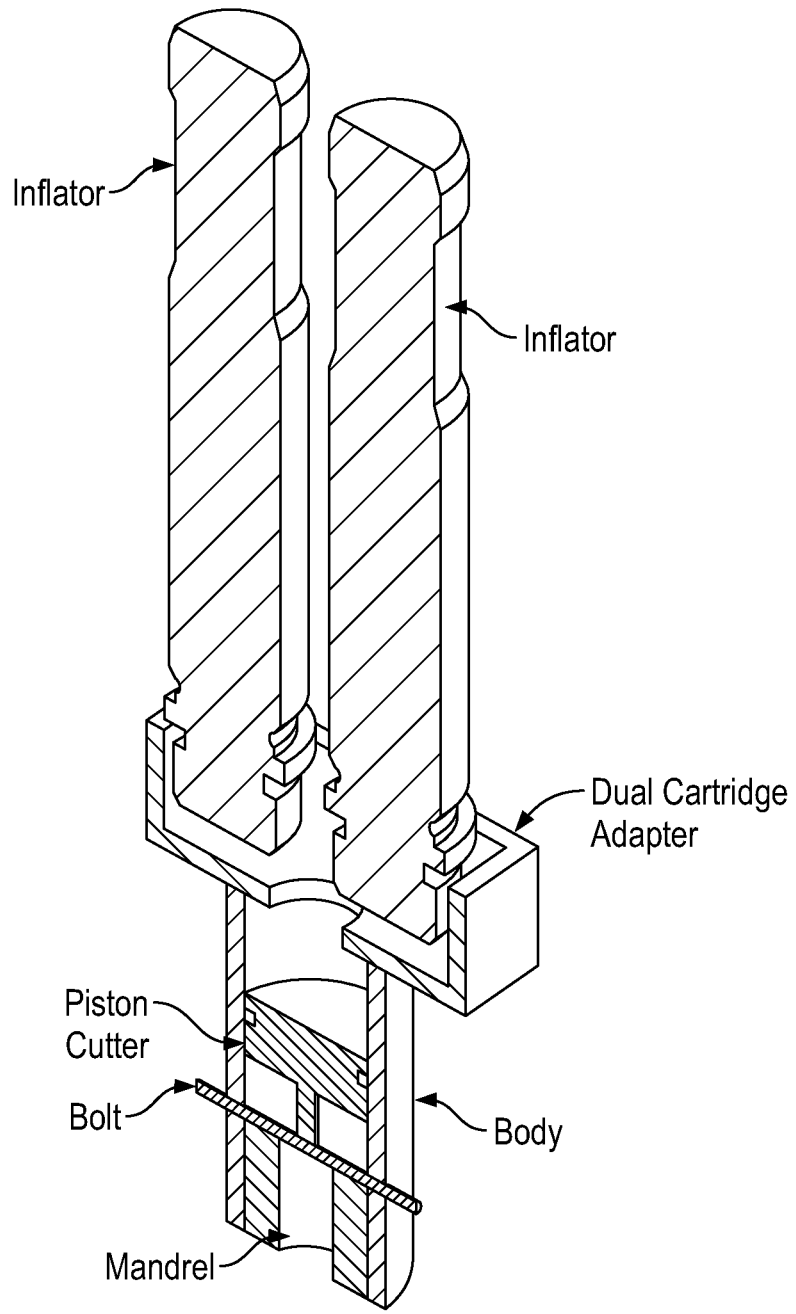
FIG. 5 shows a perspective view of a dual inflator bolt cutter initiator.
Figure 6:
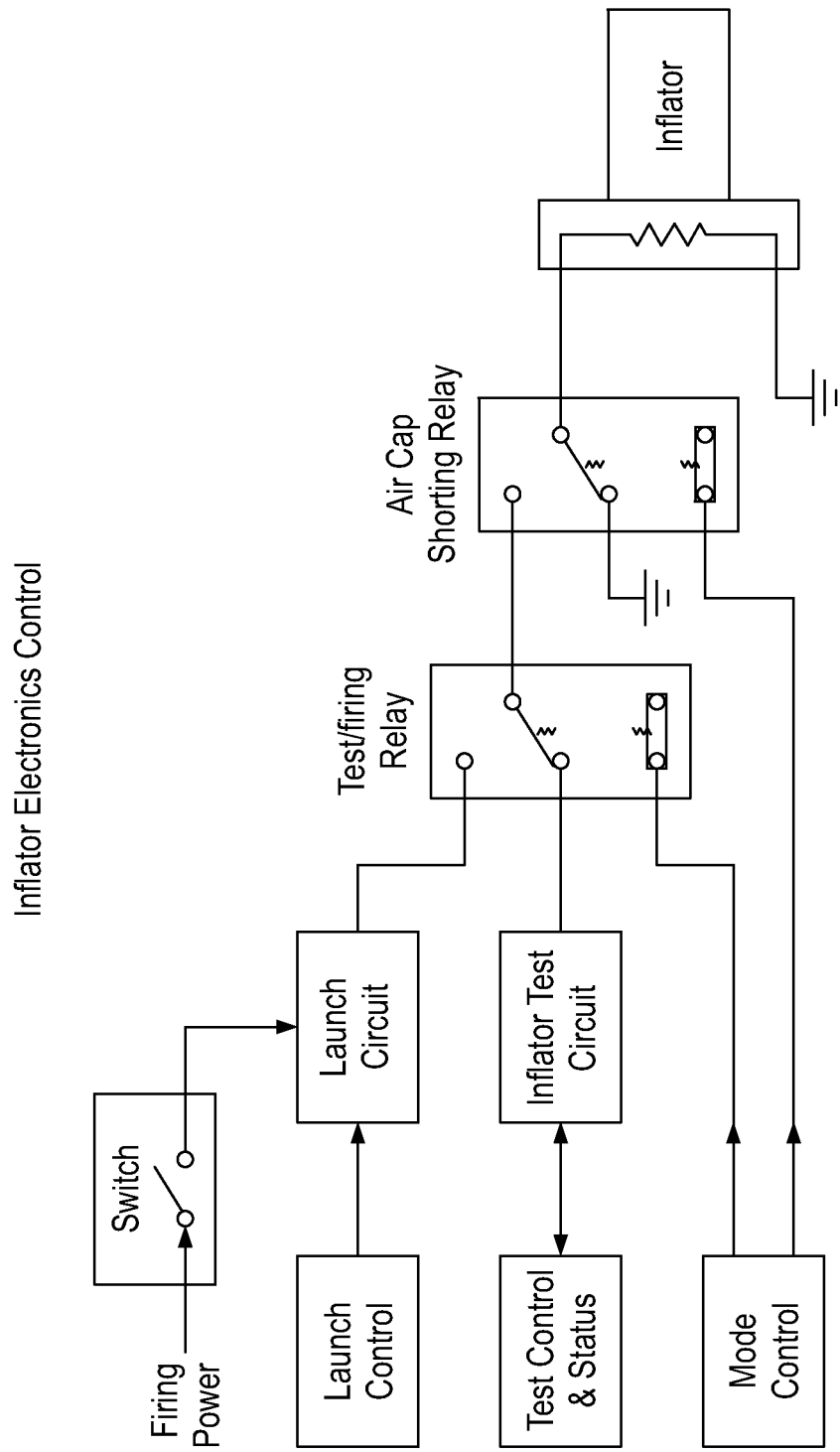
FIG. 6 is a schematic illustration of an inflator electronics control.

FIG. 5 shows an exemplary embodiment of a dual inflator bolt cutter. In this embodiment, two inflators can be attached to a dual cartridge adaptor. Upon inflator initiation, inflator gases can act upon a piston cutter that can work in conjunction with a mandrel to cut a bolt or similar object held between them. Similar principles can be used to cut a cable.

Some of the advantages of an inflator-based actuation system over known actuation systems can include:
Small compact size (cigar to soup can size, depending on output requirements)
Minimal power requirements to activate (simple battery backup)
Proven reliability in the automotive industry (99.9999%)
COTS availability in a wide range of power outputs
Easily handled and stored (similar to CO2 cartridges)
Increased safety and reduced maintenance by eliminating pressurized air systems
Reduced training to operate and maintain the systems
Reduced costs (maintenance and manning reductions)
Other exemplary embodiments that include the concepts disclosed herein can include a hot gas generator (HGG) body, and a HGG pressure cartridge, to name a few non-limiting examples.

The above description is presented to enable a person skilled in the art to make and use the systems and methods described herein and is provided in the context of a particular application and its requirements. Various modifications to the embodiments will be readily apparent to those skilled in the art, and generic principles defined herein may be applied to other embodiments and applications without departing from the spirit and scope of the claims Thus, there is no intention to be limited to the embodiments shown, but rather to be accorded the widest scope consistent with the principles and features disclosed herein.

What is claimed is:

1. A modular actuation system, comprising: a valve body unit comprising:
   a valve body;
   an inlet;
   an outlet;
   a piston;
   a valve shuttle;
   a retaining cap;
   a gas generator adapter having a plurality of gas generator connection ports; and
   a plurality of gas generators operatively connected to the valve body via the plurality of gas generator connection ports,
   wherein said one or more gas generators each comprises an automotive airbag inflator device,
   said actuation system further comprising a controller for activating the gas generators in response to an activation signal, wherein, upon activation, gas from the one or more gas generators acts on the piston to achieve desired movement or operation of the actuation system.

2. The modular actuation system of claim 1, further comprising a directional control valve operatively connected to the gas generator adapter.

3. The modular actuation system of claim 1, further comprising a power supply.

4. The modular actuation system of claim 2, wherein the controller is configured to activate said plurality of gas generators sequentially and with a predetermined time delay.

5. The modular actuation system of claim 1, wherein the plurality of gas generators each comprise a cold-gas automotive airbag inflator.

6. The modular actuation system of claim 2, wherein the plurality of gas generators each comprise a cold-gas automotive airbag inflator.

7. The modular actuation system of claim 4, wherein the plurality of gas generators each comprise a cold-gas automotive airbag inflator.

8. The modular actuation system of claim 1, wherein the plurality of gas generators each comprise a hot-gas automotive airbag inflator.

9. The modular actuation system of claim 2, wherein the plurality of gas generators each comprise a hot-gas automotive airbag inflator.

10. The modular actuation system of claim 4, wherein the plurality of gas generators each comprise a hot-gas automotive airbag inflator.

11. The modular actuation system of claim 1, wherein the plurality of gas generators are removably connected to the valve body via the plurality of gas generator connection ports.

* * * * *